Nov. 2, 1926.
G. E. DRYDEN
FENDER
Filed July 2, 1925
1,605,102
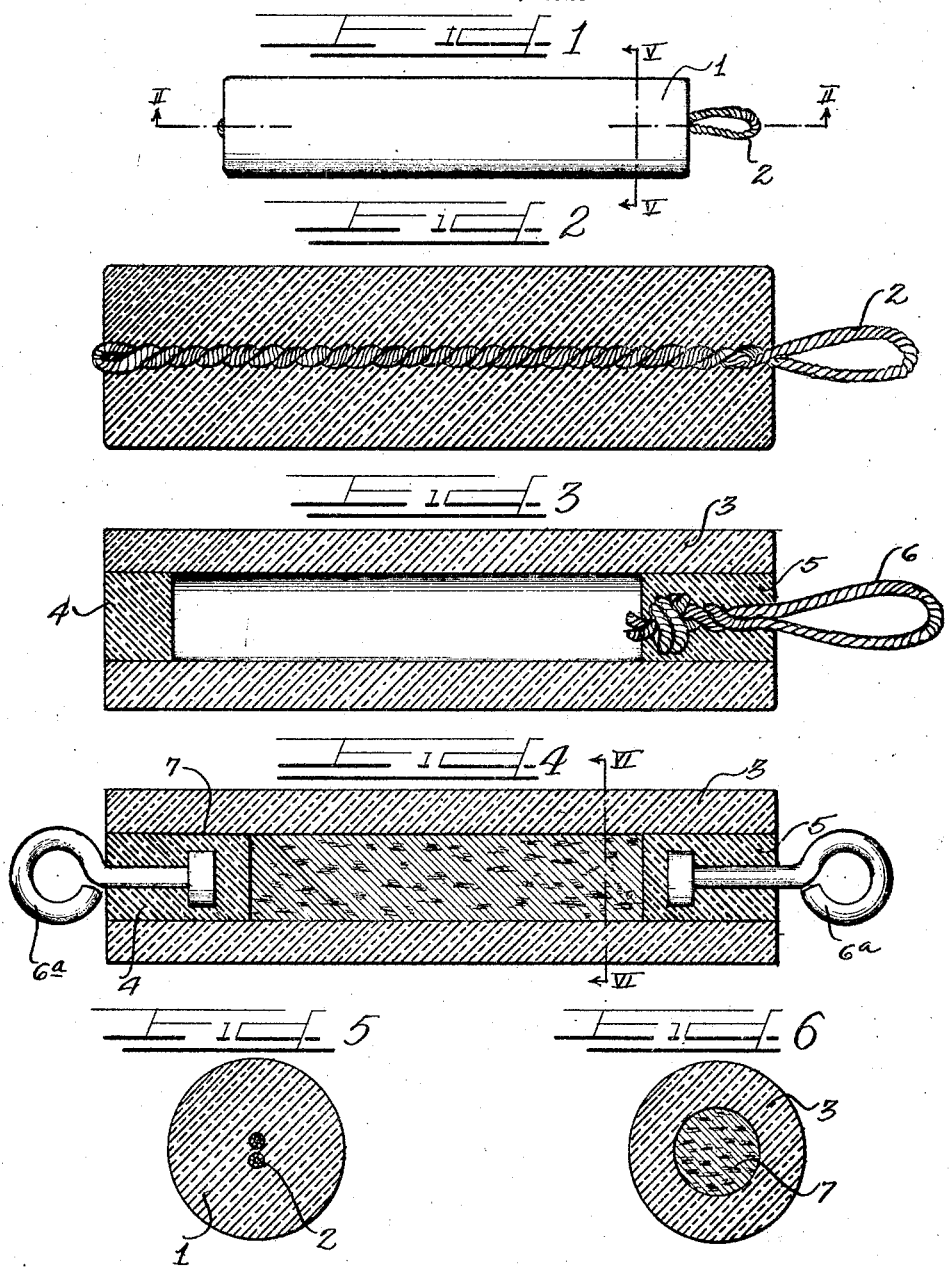

Patented Nov. 2, 1926.

1,605,102

UNITED STATES PATENT OFFICE.

GEORGE EASTMAN DRYDEN, OF CHICAGO, ILLINOIS, ASSIGNOR TO DRYDEN RUBBER COMPANY, A CORPORATION OF ILLINOIS.

FENDER.

Application filed July 2, 1925. Serial No. 41,168.

This invention relates to fenders in general and more particularly to such fenders as are adapted to be used in connection with boats and docks, and the like. It is an object of this invention to provide an efficient fender which will not mar the surface of a boat, or the like, with which it is used or anything with which it may be contacted.

It is further an important object of this invention to provide a fender which will float.

It is also an important object of this invention to provide a fender which may be simply and economically manufactured.

It is further an object of this invention to provide a fender which is light and which may be easily handled.

Other and further important objects of this invention will be apparent from the disclosures in the specification and the accompanying drawings.

This invention (in a preferred form) is illustrated in the drawings and hereinafter more fully described.

On the drawings:

Figure 1 is a longitudinal view of a fender embodying this invention.

Figure 2 is a longitudinal section with parts in elevation at the line II—II of Figure 1.

Figure 3 is a longitudinal section showing a modified form of this invention.

Figure 4 is likewise a longitudinal section showing a further modified form of this invention.

Figure 5 is a cross section at the line V—V of Figure 2.

Figure 6 is a cross section at the line VI—VI of Figure 4.

As shown on the drawings:

Referring to the drawings, numeral 1 represents a cylindrically shaped member of rubber composition which is molded about a strap 2, which strap is formed by doubling the length of a strand of rope and securing the ends of said strand. The strap 2 is twisted throughout the length thereof to form a twisted portion which is enclosed by the cylindrical member 1 molded thereover leaving a bight at one end thereof with which to secure the same to a cleat or the like on a boat or dock. The bight of the strap 2 may also be suspended from a line as desired. The member 1 is preferably of a composition such as pure rubber which will float. Referring to Figure 3, there is substituted for the member 1 of the previous modification a hollow cylindrical tube 3 of a composition such as rubber which is closed at one end thereof by a stopper or closure 4 also of rubber and vulcanized to said tube. The other end of the tube 3 is closed in a similar manner by a second stopper 5 of a similar composition which is molded around the knotted end, and a portion of the length of a strap 6.

As shown in Figure 4, there may be supplied within the tube 3 between the stoppers thereof, a cork or other similar filling 7. In the form shown in Figure 4 I have shown fastening means comprising screw eyes 6ª of any suitable material, the shanks of which extend through the stoppers 4 and 5 and are suitably secured inside said stoppers. It will be observed that the device in each modification is floatable. It will also be evident that I have provided a fender which will not injure the surface of a side of a boat or the like on which it is used and that said fender may be easily and economically manufactured.

While rubber composition is referred to as a preferable material, it will be understood that this invention contemplates the use of any other suitable material which is resilient, flexible and buoyant.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a fender, a hollow member of rubberized material, a closure vulcanized thereto, and a strap molded in said closure.

2. In a fender, a hollow member of rubber, a closure vulcanized thereto, a strap anchored in said closure, and a filler in said member.

In testimony whereof I have hereunto subscribed my name.

GEORGE EASTMAN DRYDEN.